Nov. 19, 1963

G. L. BAYERL 3,111,114

FEED LEVELING APPARATUS

Filed Oct. 2, 1961

INVENTOR.
GEORGE L. BAYERL
BY
ATTORNEYS 3,111,114
FEED LEVELING APPARATUS
George L. Bayerl, Lester Prairie, Minn.
Filed Oct. 2, 1961, Ser. No. 142,073
2 Claims. (Cl. 119—52)

This invention relates to a feeding trough and more particularly to a feed leveling device in connection therewith to evenly distribute feed throughout the full extent of said trough. More specifically, reference is had to a trough annular in form and on the order of being 28 to 30 feet in diameter providing space for a substantial number of livestock and to which feed will be supplied to one point thereof as through a chute from a silo. Present in the art of feeding troughs erected directly about silo structures and these generally have a track mounted about the silo carrying various types of implements for supplying feed to and for evenly distributing feed throughout the trough.

The applicant's structure represents a substantial improvement in the art in its simplicity of structure and the relative low cost of its construction and the ease of its installation.

It is an object of this invention therefore to provide a relatively inexpensive simply constructed feed distributing device in connection with a feeding trough.

It is another object of this invention to provide a feed leveling device for an annular feed trough comprising a centrally located upstanding member having an arm extended radially therefrom having means in connection therewith for engaging the feed in the trough for distributing and leveling the same for an even distribution of feed throughout the full extent of said trough.

These and other objects and advantages of the invention will be fully set forth in the following description made in connection with the accompanying drawings in which like reference characters refer to similar parts throughout the several views and in which.

Figure 1:
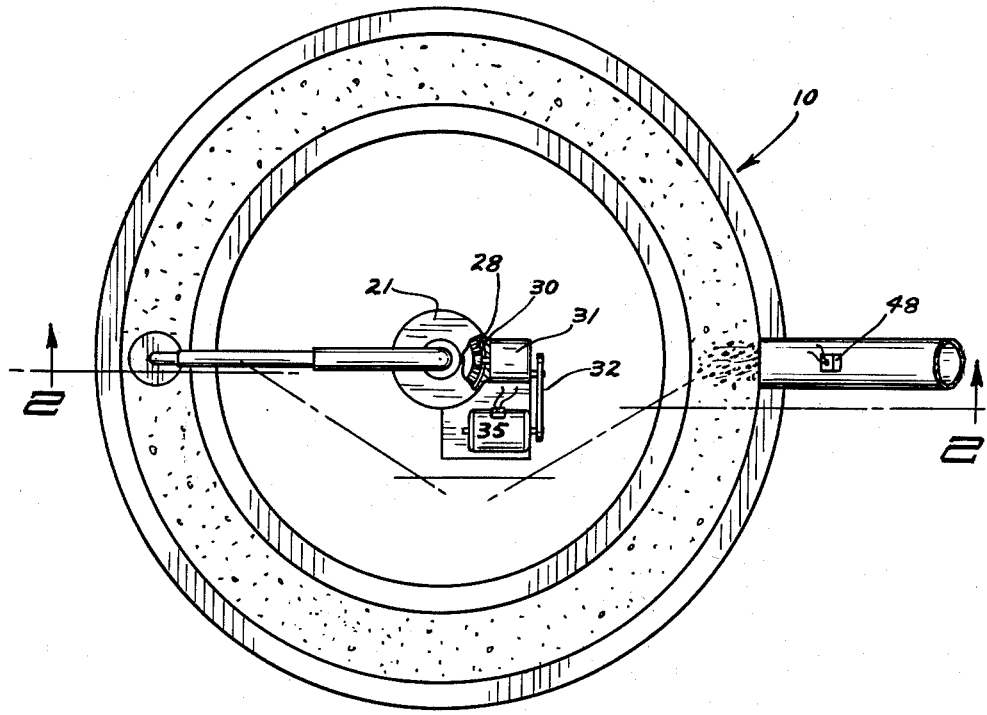
FIG. 1 is a top plan view of applicant's device.
Figure 2:
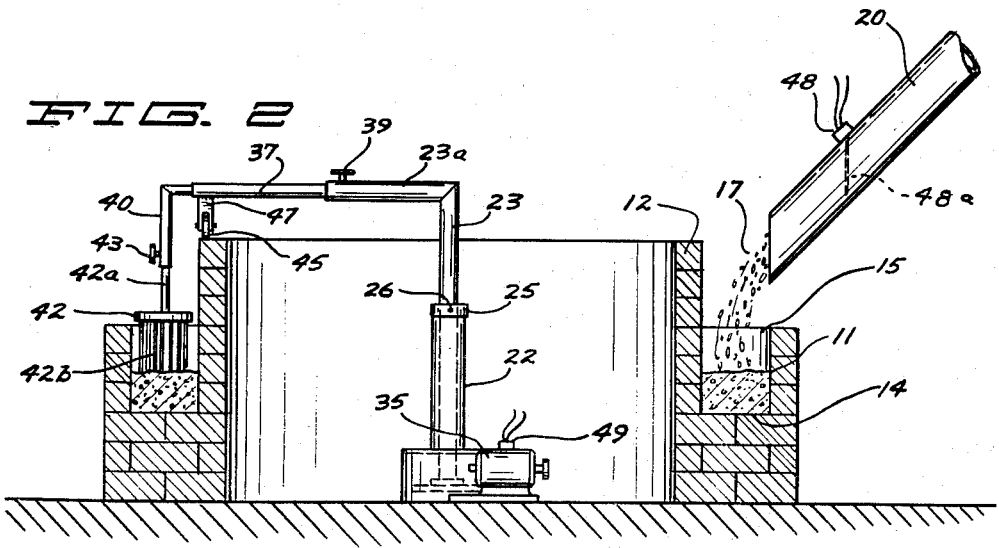
FIG. 2 is a view shown in vertical section taken on line 2—2 of FIG. 1 as indicated by the arrows.

Referring to the drawings, applicant's feeding apparatus is shown in which an annular feeding trough structure is indicated generally by the numeral 10. Applicant's structure may be variously formed and in the present embodiment is shown being formed as of concrete blocks. A practical size for such a structure is on the order of being 28–30 feet in diameter, having a front or outer wall 11 on the order of sixteen inches in height, and an inner wall 12 sufficiently spaced from said outer wall to form the width of a feeding chamber 15 and being on the order of twenty-four inches in height. Said walls are supported on a base portion 14 which forms the base or bottom surface of said feeding chamber 15. The feeding material or feed is indicated by the numeral 17.

Feed may be provided and fed into said feeding chamber in various ways. In the present embodiment of the invention herein a chute 20 of a common design is shown which will extend from a source of supply, such as a silo, and will be operatively associated therewith in a known and conventional manner. It is convenient to deliver feed to a single portion of the feeding chamber as here shown, and in connection therewith a simple and convenient means is provided for a distribution of the feed throughout the full extent of the feeding chamber.

Located centrally of said feeding trough structure is a ground supporting base housing 21 having a sleeve 22 upstanding therefrom. Journaled in said sleeve in a conventional manner is a shaft 23 having a right-angled arm portion 23a integral therewith. A thrust bearing 25 is mounted at the upper end portion of said sleeve and supports said shaft as by a pin 26, which will be removably disposed through an aperture in said shaft in register therewith.

Said base 21 will have a removable portion not here shown for access to the lower end portion of said shaft for mounting thereon a beveled gear 28 for engagement with a beveled gear 30 in connection with a gear reduction box or unit 31 of conventional design which will be driven by a pulley mounted belt 32 connecting said gear box with the drive shaft of a motor 35, with said motor being connected to a suitable supply of current.

Forming an extension of said arm 23a and being telescopic therewith is an arm portion 37 secured in position relative to said arm 23a by a friction screw 39 having a convenient head portion for manual operation. Said arm portion 37 has a right-angled depending portion 40 integral therewith and preferably tubular in form.

In connection with said depending arm portion is a feed leveling member or spreader 42 which may be variously formed and is here shown comprising a plate-like head portion having a plurality of substantially rigid tines 42b depending therefrom and having an upstanding arm or shaft portion 42a disposed partially within said tubular arm portion 40 to be telescopically associated therewith and adjustably secured therein by a friction screw 43 having a conventional head portion for manual operation.

Said arm 37 has secured thereto adjacent the outer end thereof in vertical alignment with said wall 15 a depending bracket 47 having a caster 45 journaled therein, with said caster riding on the upper surface of said wall in supporting said arm.

In the present embodiment of the applicant's invention, a switch 48 is indicated mounted on the chute 20 and comprising an actuating arm 48a depending within said chute and being adapted to be actuated by the passage of feed through said chute. Said switch 48 will be in circuit with a switch 49 in connection with said motor 35 for starting and stopping said motor. Said switch 49 will be of a conventional design of a time delay closing switch. Said switches 48 and 49 and the motor 35 will be wired in a conventional manner.

Applicant's structure represents a simply constructed apparatus for an efficient handling of feed for the purpose of feeding a substantial number of livestock, such as cows or horses. It is convenient to have feed deposited in one place in a feeding trough and then the problem which immediately arises is one of effecting a rapid and even distribution of feed throughout the full extent of the feeding trough.

With referenec to the applicant's structure, the feeding chute 20 will run from a supply of feed, such as a silo, and feed will be fed into the chute in a conventional manner. As the feed engages the switch actuating arm 48a, it will close the circuit which includes the motor 35 to start the motor in operation, which in turn will rotate the shaft 23 and the feed leveling device 32 in association therewith. In connection with the gear reduction box 31, the speed of rotation of said feed leveling member 42 may be set at any desirable rate. However the applicant has found it desirable to have the feed leveling member make a complete rotation of the feeding chamber on the order of approximately ten seconds. The feed leveling member will continue to rotate so long as feed is passing through chute 20. When feed is no longer passing through said chute, with reference to the delay switch 49, the motor will continue to operate until the feed leveling member has made at least one complete rotation after the supply of feed has been cut off, and then said switch 49 will break the circuit in connection with the motor 35 to cut off the supply of current from said motor.

The speed of rotation of said feed leveling member through the feeding chamber and the interval of time before the motor 35 is stopped after the supply of feed is cut off are minutes of adjustment as to what is desirable under any given circumstances.

The applicant has provided a very convenient means for relieving the sleeve 22 and the shaft 23 of any degree of strain by the use of the caster 45 riding on the upper surface of the inner wall 12 in support of the arm portion 37.

Applicant's device has proved to be very efficient in actual operation and it is believed that the very simplicity of its construction represents a substantial improvement in the art.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claims.

What is claimed is:

1. A feed distributing apparatus having in combination, an annular open top feeding trough having an inner wall of greater height than the outer wall thereof and a chamber for receiving feed recessed between said walls, a radial arm having a free end portion extending over said chamber, a rotatable upstanding shaft supporting said arm, a feed leveling member depending from the free end portion of said arm disposed in said chamber, a bracket riding on one of said walls movably supporting said arm adjacent the free end thereof, means rotating said shaft, a chute delivering feed into said chamber from a source of supply, an electrical switch carried by said chute actuated by feed passing through said chute actuating said last mentioned means to move said leveling means through said chamber as feed is delivered thereinto.

2. A feed distributing apparatus having in combination, an annular open top feeding trough comprising spaced concentric walls defining a chamber therebetween and forming the inner and outer side walls thereof, an upstanding shaft centrally of said trough, means rotating said shaft, an arm carried by said shaft extending radially of said trough, means for leveling feed in said chamber depending from the free end of said arm, a bracket riding on the upper edge portion of one of said walls supporting said arm adjacent the free end portion thereof, a chute communicating with a source of supply delivering feed into said chamber, and an electrical switch carried by said chute actuated by feed passing therethrough in circuit with said means rotating said shaft to actuate the same.

References Cited in the file of this patent

UNITED STATES PATENTS

| | | |
|---|---|---|
| 2,646,023 | Virgil | July 21, 1953 |
| 2,745,539 | Hazen | May 15, 1956 |
| 2,747,549 | Winter | May 29, 1956 |
| 2,759,452 | Arthur | Aug. 21, 1956 |
| 2,836,149 | Rutten | May 27, 1958 |
| 2,867,190 | Rutten | Jan. 6, 1959 |
| 2,924,197 | Haen | Feb. 9, 1960 |